United States Patent

Neumann et al.

Patent Number: 5,958,509
Date of Patent: Sep. 28, 1999

[54] COATING OF MOLDED PLASTICS ARTICLES

[75] Inventors: Petra Neumann, Böhl-Iggelheim; Joachim Rösch, Ludwigshafen; Ulrich Büschges, Wachenheim, all of Germany

[73] Assignee: BASF Aktiengesellschaft, Ludwigshafen, Germany

[21] Appl. No.: 08/931,526

[22] Filed: Sep. 16, 1997

[51] Int. Cl.⁶ ........................................................ B05D 1/36
[52] U.S. Cl. ................................ 427/255.26; 427/255.39; 427/322; 427/412.3; 427/490; 427/491; 428/447; 428/451
[58] Field of Search ..................................... 427/536, 539, 427/490, 491, 322, 412.3, 255.26, 255.39; 428/447, 451

[56] References Cited

FOREIGN PATENT DOCUMENTS

| | | |
|---|---|---|
| 392 115 | 10/1990 | European Pat. Off. . |
| 558 886 | 9/1993 | European Pat. Off. . |
| 39 25 901 | 8/1989 | Germany . |
| 62-179536 | 8/1987 | Japan . |
| 1014687 | 12/1965 | United Kingdom . |
| 2021976 | 12/1979 | United Kingdom . |

OTHER PUBLICATIONS

Weichart et al, Vak.Prax. (1991), 3(1), pp. 22–26, 1991.

Pastverarbeiter 37 (6), VDI–Verlag 1986, pp. 107–117 and 97–107.

*Primary Examiner*—Erma Cameron
*Attorney, Agent, or Firm*—Keil & Weinkauf

[57] ABSTRACT

A method of coating molded plastics articles which comprises first of all fluorinating, sulfonating, oxidizing or otherwise activating the surface of the articles and then covering them with a silane coating material.

8 Claims, No Drawings

COATING OF MOLDED PLASTICS ARTICLES

BACKGROUND OF THE INVENTION

1. Field of the Invention

The present invention relates to a method of coating molded plastics articles and to articles obtainable by this method.

2. Description of the Related Art

Molded plastics articles, especially hollow articles such as bottles, canisters or tanks, frequently exhibit considerable permeation, especially to small organic molecules. To reduce this permeation it is possible to modify the surface of such hollow articles, especially plastic fuel tanks (PFTs) and fuel oil tanks, in a variety of ways. A widespread example is the fluorination or sulfonation of the container surface (Forming barrier layers in hollow plastics articles, in: Plastverarbeiter 37 (6), VDI-Verlag 1986). Modifications of this kind lead to a substantially reduced permeation to, for example, the methanol which is often present in fuels. For industrial use, however, this permeation barrier must possess long-term stability and must withstand mechanical loads over long periods of time. It is in this respect, however, that the methods known to date for the surface treatment of such molded plastics articles leave much to be desired.

SUMMARY OF THE INVENTION

It is an object of the present invention to find a method of coating molded plastics articles which provides long-term prevention of the permeation of relatively small organic molecules, such as methanol, so that only a small rise in permeation is found even after long-term mechanical loading.

We have found that this object is achieved by a method of coating molded plastics articles which comprises first of all fluorinating, sulfonating, oxidizing or otherwise activating the surface of the articles and then covering them with a silane coating material.

We have also found molded plastics articles which are obtainable by this method.

DESCRIPTION OF THE PREFERRED EMBODIMENTS

The molded plastics articles that can be coated by the novel method can have been produced from various plastics. Examples of suitable basic materials are polyethylene, polypropylene, polyethylene terephthalate, polyamide and PVC. It is preferable for the molded plastics articles to be coated to consist essentially of polyethylene, especially of relatively high-density polyethylene (HDPE). In addition to pure plastics, blends of the abovementioned plastics with one another or with further components are also suitable. In addition, composite structures comprising layers of different plastics or fibers are suitable as substrates for the novel coating method.

The novel method is suitable with particular advantage for the coating of PFTs. Many countries require PFTs to meet defined emission limits. Long-term compliance with these limits, even after mechanical loading, can be achieved by means of a novel coating method.

In accordance with the novel coating method the surface of the molded plastics article, especially that surface which comes into contact with a permeable substance such as methanol, is first of all conventionally fluorinated, sulfonated, oxidized or otherwise activated. The term activation here is intended to denote those processes which affect the hydrophilicity or microstructure of the plastics surface in such a way that the subsequent coat has adequate adhesion.

Examples of suitable fluorination techniques and sulfonation techniques are described in the article Forming barrier layers in hollow plastics articles, in: Plastverarbeiter 37 (6), VDI-Verlag 1986, pp. 107–117 and 97–107, respectively. Fluorination in particular is an appropriate surface treatment for this first step of the method. In addition, the plastics surface can be activated by, for example, oxidation, for instance by flaming, or by plasma treatment under the action of electrical discharge, as is customary, for instance, for activating polypropylene bumpers for automobiles.

The surface of the molded article which has been pre-treated in this way is subsequently covered with a silane coating material. This can be done using all customary commercial silane coating materials. Preference is given to the use of those silane coating materials which are able to lead to a crosslinked structure; generally, therefore, to silane compounds which include not only the silane groups but also further functional groups, such as vinylic double bonds, isocyanate groups or oxirane groups. A particularly suitable silane coating material is one which comprises silanes of the formula I

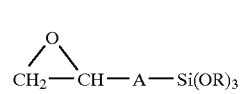

I where:

A is $C_1$–$C_{20}$-alkylene, in which nonadjacent methylenes other than those in positions α- and ω can be replaced by oxygen in ether function, and R is $C_1$–$C_4$-alkyl.

Suitable linkers A are methylene, ethylene and/or straight-chain or branched propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene and eicosylene.

In these alkylene linkers it is possible for methylenes—except for the end ones—to be replaced by oxygen in ether function. Linkers A of this kind are preferably derived from ethylene oxide or propylene oxide, i.e. they contain polyethylene glycol units or polypropylene glycol units. A particularly preferred linker A has the structure —$CH_2$—O—$CH_2$—$CH_2$—.

The radicals R preferably are methyl, but can also be ethyl, n-propyl, isopropyl, n-butyl, isobutyl, sec-butyl and tert-butyl.

A preferred silane compound I is the compound

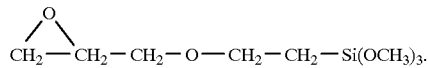

Particularly effective silane coating materials are those which can be converted by crosslinking into a stable network. Compounds able to bring about such crosslinks, for example in combination with the silane compounds I, are, for example, diamino, dithio or dihydroxy compounds, the latter being preferred. A particularly suitable crosslinking dihydroxy compound is 2,2-p-hydroxyphenylpropane, known as bisphenol A.

For coating the plastics surface which has been pretreated by fluorination or sulfonation, the silane compound is generally first converted to the corresponding siloxane compound using a stoichiometrically calculated amount of water in the presence of a little acid. To this mixture there is then added a solution of the crosslinking compound in organic solvent, and reaction takes place in the presence of a catalyst.

Particularly suitable solvents are highly volatile polar solvents such as acetone, methanol, ethanol, n-propanol and especially isopropanol.

Suitable catalysts are basic compounds, especially tertiary amines; methylimidazole is used with particular preference. The amount of catalyst depends on the amount of crosslinking compound. Catalysts and crosslinking compounds are generally employed in a molar ratio of from 0.05:1 to 1:1, preferably from 0.1:1 to 0.5:1.

The mixture of the hydrolyzed silane, the crosslinking compound, the solvent and the catalyst is intimately mixed and can then be applied in a variety of conventional ways to the plastics surface, for example by dipping, spraying, rolling or spreading. Coating preferably takes place by dipping.

Coating and also curing can be performed at various temperatures, for example from 10° C. to 150° C., preferably from 20° C to 130° C., with higher temperatures, for instance from 80 to 140° C., being particularly advantageous for curing and drying.

Drying can also be accelerated by reducing the pressure; generally, however, all operations are carried out at ambient pressure. Adequate ventilation is advantageous for rapid and uniform drying.

The molded plastics articles obtainable by the novel method exhibit very low permeation of organic solvents, especially methanol. Furthermore, this low permeation shows little if any increase even after long-term mechanical loading.

The invention is illustrated by the following examples.

EXAMPLES

Example 1

Preparing a Silane Coating Material 1.35 ml of 0.05 N HCl (corresponding to about 0.075 mol of water) were added slowly with stirring to 19.1 g (0.1 mol) of glycidyloxypropyltrimethoxysilane. The mixture was stirred for one hour without cooling and then combined with a solution of 9.12 g (0.04 mol) of bisphenol A and 0.82 g (0.01 mol) of N-methylimidazole in 15 ml of isopropanol. This mixture was stirred at 25° C. for 2 hours more and processed after about 5 hours up to not more than 20 hours.

Example 2

Coating Polyethylene Bottles 250 ml polyethylene bottles (manufacturer: Haltermann, Hamburg) were fluorinated by off-line fluorination. The inside of the bottles was then carefully coated by introducing 50 ml of silane coating mixture from Example 1 and inclining the bottles, and then excess coating material was discarded. The solvent was evaporated off by heating at 90° C. for 10 minutes, and then the bottles were dried at 80° C. in an oven for 5 hours.

Example 3

Investigating the permeation behavior of polyethylene bottles coated in accordance with the invention in comparison with bottles not treated in accordance with the invention.

The coated polyethylene bottles from Example 2 were filled with 100.0 g of the test medium FAM-B (in accordance with DIN 51684, manufacturer Haltermann, Hamburg) and were sealed with a PE screw cap and rubber seal. The test bottles were weighed and shaken at different temperatures for 30 days. Subsequently, the decrease in weight as a result of permeation was determined by weighing the bottles again. The result is shown in the following table:

| Treatment of test bottle | Permeation at 25° C. | Permeation at 40° C. |
| --- | --- | --- |
| untreated (comparison example) | 17.1% | 42.1% |
| only silane coating (comparison example) | 20.9% | 44.8% |
| only fluorination (comparison example) | 0.6% | 4.3% |
| fluorination + silane coating | 0.2% | 1.2% |

Example 4

The permeation experiment of Example 3 was carried out using the test medium CEC 85 (from Haltermann, Hamburg). The table below shows the result:

| Treatment of test bottle | Permeation at 25° C. | Permeation at 40° C. |
| --- | --- | --- |
| untreated (comparison example) | 24.0% | 56.4% |
| only silane coating (comparison example) | 29.3% | 58.5% |
| only fluorination (comparison example) | 0.02% | 0.06% |
| fluorination + silane coating | 0.02% | 0.02% |

We claim:

1. A method of coating molded plastics articles, which comprises first of all fluorinating the surface of the article and then coating the fluorinated surface with a silane coating material.

2. The method of claim 1, wherein the molded plastics article consists essentially of polyethylene.

3. The method of claim 1, wherein the molded plastics article is a plastic fuel tank.

4. The method of claim 1, wherein the silane coating material comprises silanes of the formula I

where

A is $C_1$–$C_{20}$-alkylene, in which nonadjacent methylenes other than those in positions α and ω can be replaced by oxygen in ether function, and R is $C_1$–$C_4$-alkyl.

5. The method of claim 1, wherein the silane coating material additionally comprises crosslinking dihydroxy compounds.

6. The method of claim 5, wherein the silane coating material comprises bisphenol A as crosslinking dihydroxy compound.

7. A molded plastics article obtained by the method as claimed in claim 1.

8. An article as claimed in claim 7 in the form of a plastic fuel tank.

* * * * *